(12) United States Patent
Rose

(10) Patent No.: US 7,643,497 B2
(45) Date of Patent: Jan. 5, 2010

(54) METHOD AND APPARATUS FOR INTERMEDIATION BETWEEN SERVICE PROVIDERS AND SERVICES USERS

(75) Inventor: Murielle Rose, Cuers (FR)

(73) Assignee: Gemalto SA, Meudon (FR)

( * ) Notice: Subject to any disclaimer, the term of this patent is extended or adjusted under 35 U.S.C. 154(b) by 778 days.

(21) Appl. No.: 10/505,114

(22) PCT Filed: Feb. 18, 2003

(86) PCT No.: PCT/FR03/00531

§ 371 (c)(1),
(2), (4) Date: Feb. 25, 2005

(87) PCT Pub. No.: WO03/071760

PCT Pub. Date: Aug. 28, 2003

(65) Prior Publication Data

US 2005/0141525 A1 Jun. 30, 2005

(30) Foreign Application Priority Data

Feb. 18, 2002 (FR) ................................. 02 02029

(51) Int. Cl.
*H04L 12/28* (2006.01)
*H04J 3/16* (2006.01)
(52) U.S. Cl. ........................ 370/401; 370/466
(58) Field of Classification Search .............. 370/401, 370/466
See application file for complete search history.

(56) References Cited

U.S. PATENT DOCUMENTS

| 5,236,199 | A | * | 8/1993 | Thompson, Jr. | 463/41 |
| 5,297,189 | A | * | 3/1994 | Chabernaud | 455/461 |
| 5,349,643 | A | * | 9/1994 | Cox et al. | 713/155 |
| 5,353,331 | A | * | 10/1994 | Emery et al. | 455/461 |
| 5,613,191 | A | * | 3/1997 | Hylton et al. | 725/81 |
| 5,630,204 | A | * | 5/1997 | Hylton et al. | 725/116 |
| 5,708,961 | A | * | 1/1998 | Hylton et al. | 725/81 |
| 5,793,413 | A | * | 8/1998 | Hylton et al. | 725/81 |
| 5,884,157 | A | * | 3/1999 | Karmi | 455/406 |

(Continued)

FOREIGN PATENT DOCUMENTS

WO        WO 00 46963        8/2000

(Continued)

OTHER PUBLICATIONS

Kesting, V., International Search Report, Apr. 07, 2003, PCT/FR 03/00531, 1-4.*

(Continued)

*Primary Examiner*—Andrew Lee
(74) *Attorney, Agent, or Firm*—Buchanan Ingersoll & Rooney PC

(57) ABSTRACT

An intermediation apparatus is designed to interconnect at least one service provider and at least one user by using a non-Internet channel. The apparatus includes an intelligent connection management unit for recognizing an incoming protocol and for selecting an outgoing protocol and an outgoing communications channel by referring to databases. A protocol conversion unit controlled by the management unit interconnects a service provider using a channel that implements a first communications protocol and a user using the non-Internet channel that implements a second communications protocol. The non-Internet channel is advantageously a wireless communications channel.

16 Claims, 2 Drawing Sheets

U.S. PATENT DOCUMENTS

| | | | | |
|---|---|---|---|---|
| 6,052,783 | A * | 4/2000 | Quak et al. | 726/2 |
| 6,075,796 | A * | 6/2000 | Katseff et al. | 370/466 |
| 6,081,518 | A * | 6/2000 | Bowman-Amuah | 370/352 |
| 6,097,719 | A * | 8/2000 | Benash et al. | 370/352 |
| 6,195,697 | B1 * | 2/2001 | Bowman-Amuah | 709/224 |
| 6,345,239 | B1 * | 2/2002 | Bowman-Amuah | 703/6 |
| 6,405,037 | B1 * | 6/2002 | Rossmann | 455/426.1 |
| 6,421,425 | B1 * | 7/2002 | Bossi et al. | 379/52 |
| 6,539,427 | B1 * | 3/2003 | Natarajan et al. | 709/224 |
| 6,577,597 | B1 * | 6/2003 | Natarajan et al. | 370/232 |
| 6,970,452 | B2 * | 11/2005 | Kim et al. | 370/352 |
| 7,124,101 | B1 * | 10/2006 | Mikurak | 705/35 |
| 7,133,846 | B1 * | 11/2006 | Ginter et al. | 705/54 |
| 7,188,110 | B1 * | 3/2007 | Ludtke et al. | 707/10 |
| 7,212,783 | B2 * | 5/2007 | Gaumond et al. | 455/3.06 |
| 2002/0003789 | A1 * | 1/2002 | Kim et al. | 370/338 |
| 2002/0015403 | A1 * | 2/2002 | McConnell et al. | 370/352 |
| 2002/0029193 | A1 * | 3/2002 | Ranjan et al. | 705/39 |
| 2004/0117828 | A1 * | 6/2004 | Parker et al. | 725/46 |
| 2005/0038707 | A1 * | 2/2005 | Roever et al. | 705/21 |
| 2005/0265304 | A1 * | 12/2005 | Kim et al. | 370/349 |
| 2007/0049342 | A1 * | 3/2007 | Mayer et al. | 455/558 |

FOREIGN PATENT DOCUMENTS

WO   WO 01 69891   9/2001

OTHER PUBLICATIONS

Marchent B. G. et al.; Intelligent Control of Mobile Multimedia Systems; Vehicular Technology Conference; 1998 VTC 98; 48th IEEE Ottawa, Ont., Canada; May 18-21, 1998, New York, NY, U.S.; IEEE, U.S.; May 18, 1998; pp. 2047-2051.

Zhuoqing Morley Mao et al; Achieving Service Portability Using Self-Adaptive Data Paths; IEEE Communications Magazine, IEEE Service Center; Piscataway, N.J., U.S., vol. 40, No. 1, (Jan. 2002), pp. 108-114.

Chan M. C. et al.; Next-Generation Wireless Data Services: Architecture and Experience; IEEE Personal Communications, IEEE Communications Society, U.S., vol. 6; No. 1; (Feb. 1999); pp. 20-33.

Wang H. J. et al.; Policy-Enabled Handoffs Across Heterogeneous Wireless Networks; Mobile Computing Systems and Applications; 1999; Second IEEE Workshop on New Orleans, LA. U.S.; Feb. 25-26, 1999; Los Alamitos, CA, U.S., IEEE Comput. Soc., U.S. (Feb. 25, 1999); pp. 51-60.

* cited by examiner

METHOD AND APPARATUS FOR INTERMEDIATION BETWEEN SERVICE PROVIDERS AND SERVICES USERS This disclosure is based upon French Application No. 02/02029, filed Feb. 18, 2002, the contents of which are incorporated herein by reference.

BACKGROUND OF THE INVENTION

The present invention relates to communication of data between at least one service provider and service users over a route, at least a portion which is situated outside the Internet. The route can, for example, be situated in a "wireless" communications network, such as a cellular mobile telephone network. The service provider generally comprises any entity that makes available remotely a service, in the broad sense of the term: services for communications, information, recording, access control, discussion forums, sales of services or of goods, etc. In this context, the invention proposes an intermediation platform enabling a service provider to reach a service user and vice versa under all conditions and with good quality distribution of the service.

Today, on its own server, a service provider has digital data, software, and other files representing its service. In general, it does not have its own communications infrastructure, that aspect being provided by external communications networks. Among such external networks, the Internet constitutes end-to-end communications means enabling customers to access the services via a computer. However, the Internet suffers from numerous drawbacks: it is not possible to identify the user of the service, or the provider of the service, and the network is difficult to make secure.

FIG. 1 shows the current environment for communications between service providers SP and the various types of user terminal UT, represented by a mobile telephone terminal 2, and a computer 4 of the personal computer (PC) type.

Generally, interchange between the service providers SP and the user terminals UT currently goes via the Internet 6 (Internet channel (IC)). On the user terminal side UT, the connection to the Internet 6 can take place via various intermediate sub-networks or "gateways" which link up (arrow F1) with the Internet 6 to connect the service providers SP. FIG. 1 shows an example in the form of a wireless application protocol (WAP) gateway 8 used by the various mobile telephone operators or "mobile network operators" (MNOs) 10.

Another connection in common use is an "all-Internet" connection between the service provider SP and the PC 4 of the user U. The PC 4 is connected to the Internet 6 (arrow F2).

Therefore, on the user side, numerous possible different types of terminal exist, each operating on the basis of an independent operator (e.g. among the various MNOs accessible in a geographical area) making it possible to access in various manners the various services offered by the service providers SP situated on the other side of the Internet 6.

The networks of the MNOs 10 constitute gateways managed by various independent operators, and have resulted in a "wireless data ecosystem" which has the potential to satisfy the requirements of the service providers, but at the cost of establishing agreements with a plurality of MNOs, and of providing each service in various forms each adapted to the specific protocol of a respective MNO.

The gateways constitute non-Internet channels NIC passing through various possible MNOs and other non-Internet gateway operators. The non-Internet channel NIC can incorporate not only the MNOs but also more generally any communications means external to the Internet.

Agreements exist between service providers and MNOs enabling a user to receive a proper service via reliable communications means. However, such solutions have numerous limitations. The service provider is dependent on the wireless communications network of an external operator. Its service must adapt to the requirements of the communications means, in particular for the functions that concern it, such as:

range of the service, in general limited to one region or to one country;
means for identifying the user;
protection of interchanged data; and
payment solution, etc.

The MNOs 10 can offer to their subscribers only those services for which they have agreements with the service providers SP in question. Furthermore a subscriber who travels to another country no longer has access to the same services because that subscriber is no longer served by the same MNO. An MNO who has a dual function as telephone operator and as provider of services other than telephone services can propose its own services to its subscribers only.

In view of those drawbacks and limitations, service providers are tending to develop their own communications infrastructures which are sometimes based on new technologies and which compete with the existing infrastructures of the communications operators. But such a specific infrastructure generally also suffers from the same weaknesses.

In addition, present-day users of services wish to have a wide choice of services, to receive them with quality regardless of the geographical situation of the user, and without being limited to one communications operator and to one service provider. Often, such a user has a plurality of communications sets based on various different technologies, e.g. a mobile telephone terminal, a personal digital assistant (PDA), a PC, an interactive TV set-top box, etc. Users wish to be able to receive the service of their choice at any time, anywhere, with the best possible quality, and on the set that is the highest performance in the situation in question.

SUMMARY OF THE INVENTION

An object of the invention is to satisfy the expectations of the existing non-Internet operators (NIOs), in particular, but not exclusively MNOs, by enabling them to make the best possible use of their infrastructures for as many services as possible, and thus to perform a function that extends beyond merely supplying communications channels.

Another object of the invention is to enable service providers to have a platform offering optimum distribution.

These objects are achieved by the invention by making provision to set up an intelligent intermediation platform for non-Internet channels, to which platform any service provider can connect in order to communicate with the various user terminals by using a non-Internet channel.

Such a channel is transparent to the service provider, the intermediation platform taking charge firstly of selecting the non-Internet operator as a function of the addressed user U, and secondly of adapting the communication to the specificities of that operator.

In addition, the platform can provide many other services aimed at simplifying and standardizing interchange between the user and the service provider. Thus, in a preferred embodiment, the invention provides features at the platform that consist in providing: i) enhanced security; ii) management of services; and iii) rationalized invoicing.

More particularly, in a first aspect, an intermediation apparatus is designed to interconnect at least one service provider and at least one user provided with at least one communications terminal, by using at least one non-Internet channel.

The intermediation apparatus includes intelligent connection management means, protocol conversion means and an invoicing unit.

The intelligent connection management means is for selecting a non-Internet channel of an operator, which channel is used by a terminal of the user; and selecting an outgoing protocol and an outgoing communications channel by referring to databases.

The protocol conversion means controlled by the management means interconnects a service provider using a channel that implements a first communications protocol and a user using the non-Internet channel that implements a second communications protocol.

The invoicing unit performs overall and automated invoicing for each user and periodic distribution of collected payments to the various service providers and to the various operators of the non-Internet channels.

The apparatus may periodically enter into communication with a user terminal (UT) in order to transfer characteristic data that is characteristic of the services used by the user by means of the terminal (UT), said terminal containing an application and a secure memory so as to store said characteristic data of the service used, which data is necessary for invoicing. The apparatus may implement transfer of characteristic data necessary for invoicing on its own initiative during slack periods during which activity levels drop. Said characteristic data necessary for invoicing may, for example be located in the security module of a telephone.

The apparatus of the invention also makes it possible to provide means of tracking subscribers of a non-Internet channel operator by system for changing non-Internet channel operators as a function of the use of a given service, in a manner transparent for the user. Each change of operators may take place at a given place as a function of the requested service, or for a given service as a function of the geographical location of the subscriber.

In a second aspect, the invention makes provision for the use of apparatus of the first aspect for enabling a service to be distributed by a service provider.

In a third aspect, the invention makes provision for the use of apparatus of the first aspect by an operator of non-Internet communications channels, e.g. a mobile telephone operator, to make it possible to distribute services via its communications network.

In a fourth aspect, a method for distributing services to at least one user from a service provider by means of intermediation apparatus of the first aspect, includes:

detecting a connection request from a service provider for connection using a first protocol;

checking the identity of the service provider;

searching for at least one user to be reached;

identifying a non-Internet channel to be used to reach the or each user specified by the service provider;

checking the identity of the or each user specified;

setting up a communication with the or each user specified;

creating a communications link with conversion between first and second protocols for connecting the service provider with the or each specified and validly identified user;

recording the service data necessary for invoicing;

performing overall and automated invoicing for each user; and periodically distributing collected payments to the various service providers and to the various operators of the non-Internet channels.

In a fifth aspect, a method for enabling a user to access a service provided by a service provider by means of intermediation apparatus of the first aspect, includes:

detecting a connection request from a user for connection using a second protocol over a non-Internet communications channel;

checking the identity of the user;

requesting a service offered by a service provider;

identifying a channel implementing a first protocol and to be used to reach the service provider requested by the user;

checking the identity of the service provider;

setting up a communication with the service provider;

creating a communications link with conversion between first and second protocols so as to interconnect the validly identified user and the validly identified service provider;

recording the service data that is necessary for the invoicing;

performing overall and automated invoicing for each user; and periodically distributing the collected payments to the various service providers and to the various operators of the non-Internet channels.

BRIEF DESCRIPTION OF THE DRAWINGS

The invention and the advantages that result from it will appear more clearly on reading the following description of a preferred embodiment, given merely by way of non-limiting example and with reference to the accompanying drawings, in which.

DETAILED DESCRIPTION

Figure 2:
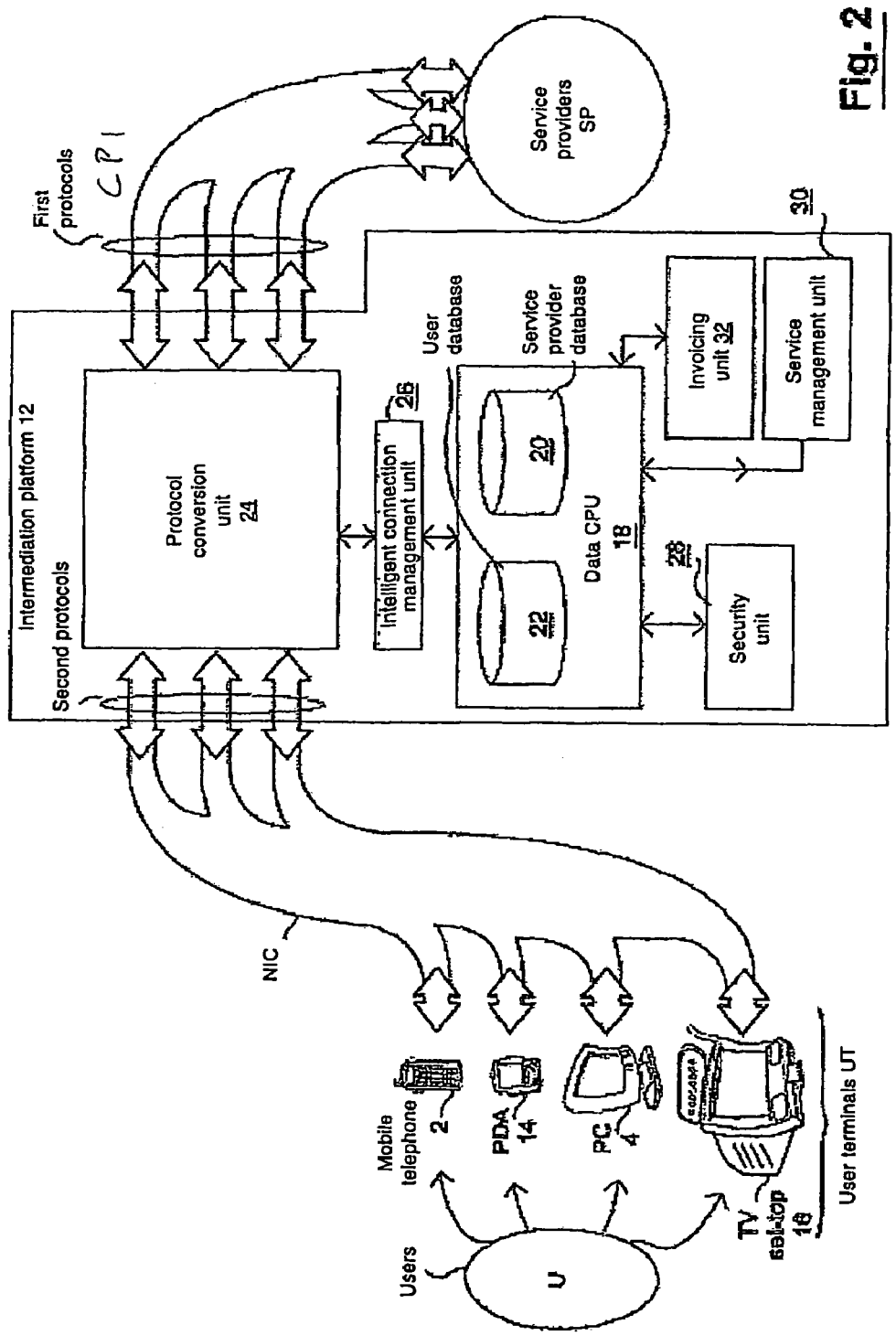
FIG. 2 is a simplified block diagram showing how an intelligent intermediation platform for non-Internet communications channels in a preferred embodiment of the invention is integrated into the context shown in FIG. 1.

As shown in FIG. 2, the intelligent intermediation platform 12 in the preferred embodiment of the invention is situated between the service providers SP and the user terminals UT that use non-Internet communications channels and that can be used by a service user U.

The platform 12 can be in the form of a set of technical means grouped together on a single geographical site or distributed over a plurality of sites.

In the example shown, the user terminals served by the platform use communications channels lying outside the Internet protocol and they comprise: a second-generation or third-generation mobile telephone 2, a PDA 14, a PC 4 communicating to wireless personal area networks protocol, including the BLUETOOTH™, or 802.11x Standard, and an interactive TV, set-top box 16. Naturally, other terminals making it possible to use non-Internet communications channels can be used: video games, equipment on board vehicles, etc.

The non-Internet channels NIC used by the terminals 2, 4, 14, 16 can consist in: i) not using the Internet at all or ii) using the Internet, but for a portion of the link only, the remainder of the link lying outside the Internet.

Figure 1:
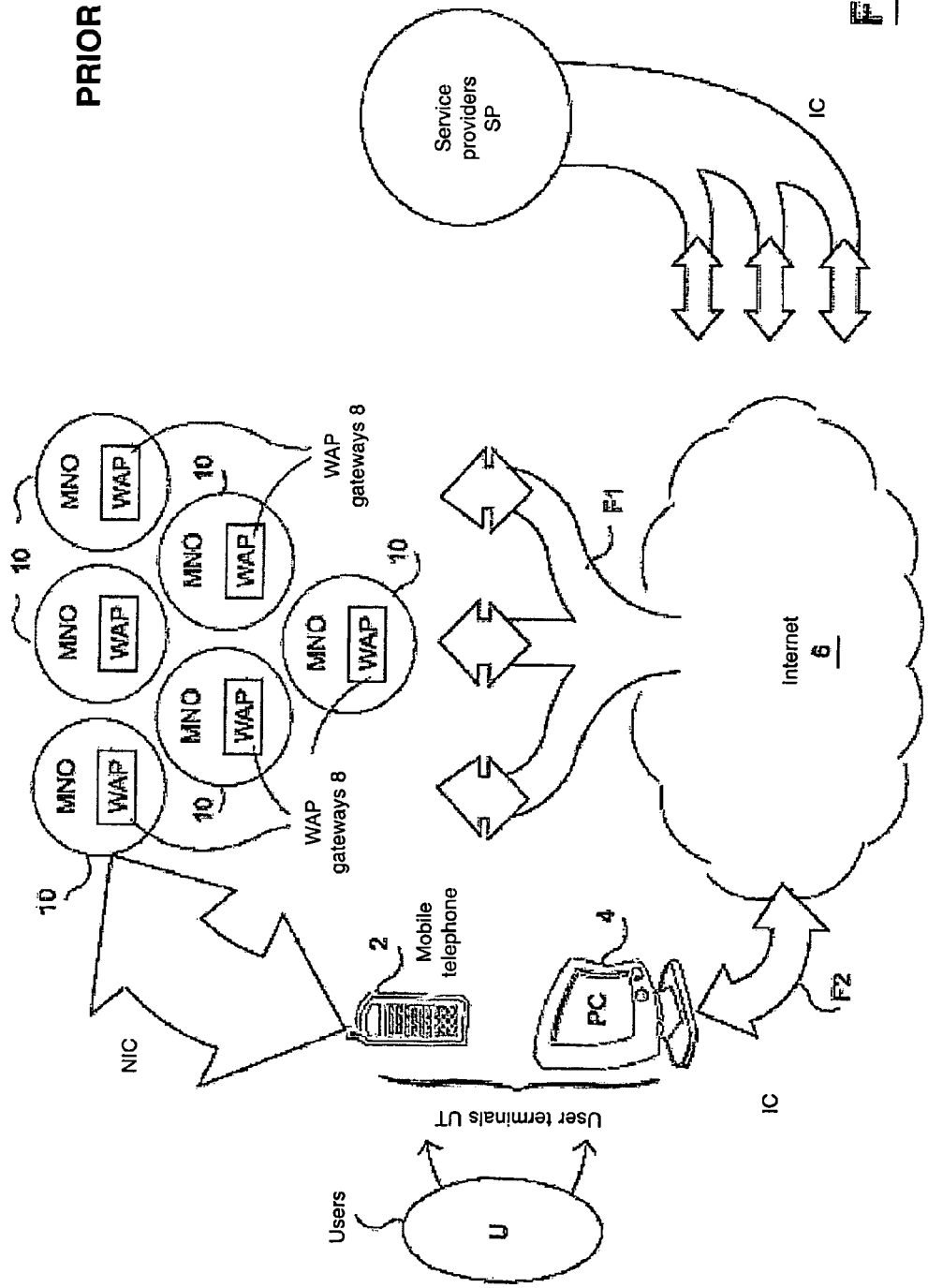
FIG. 1, is a diagram showing the possibilities for conventional connection between service providers and service users via the Internet.

Said channels are in the form of communications gateways that vary from one user terminal to another, since they are related firstly to the protocol used and secondly to the operator, e.g. the various MNOs using the WAP gateways 8 as described with reference to FIG. 1.

The function of the platform is thus to manage putting three types of entity into communication with one another: namely the users, the communications gateway operators, and the service providers.

In order to provide such connectivity and communication between the service providers and the users, the platform includes:

a central data unit 18 which incorporates two data bases:
  i) a "service provider" database 20 which groups together all of the files and data necessary for dialoguing with the service providers SP and for representing said service providers; and
  ii) a "user" database which groups together all of the files and data necessary for dialoguing with the users and for representing said users;

a protocol conversion unit 24 functionally connected to the service providers SP via communications channels (CP1) implementing first communications protocols, and to the user terminals UT via communications channels NIC implementing second communications protocols. This unit thus constitutes the point through which the incoming and outgoing protocols pass between the service providers SP and the users U. It accepts all of the second protocols of the various non-Internet channels coming from the user terminals UT and all of the first protocols of the various channels of the service providers, and it performs both-way conversion between any one of the first protocols and any one of the second protocols.

The term "protocol" (as applied to the service providers or to the users) is to be understood in its broadest sense, and to include transport protocols such as Transmission Control Protocol/Internet Protocol (TCP/IP), 802.11, application protocols, session management protocols, presentation protocols, etc.

By way of indication, such protocols on the user side can include:

cellular mobile telephone networks of second and third generation (2 G, 2.5 G, and 3 G such as the Global System for Mobile communications (GSM), the Wireless Application Protocol (WAP), the General Packet Radio Service (GPRS), and the Universal Mobile Telecommunications System (UMTS)), for each operator providing access to those networks, and further combined with the various types of possible message transmission (Short Message Service (SMS), Multimedia Message Service (MMS), electronic mail, etc.). Protocol conversion in the broadest sense thus covers setting up a specific communication related to the choice of a certain MNO, then practical use of the communications gateway of that MNO for interconnecting a user and a service provider;

interactive television networks;

private local networks (Local Area Networks (LANs) and Wireless Local Area Networks (WLANs));

pico-networks such as BLUETOOTH™ and 802.11;

etc.

The codes necessary for the various possible protocol conversion combinations are extracted from the service provider database 20 and from the user database 22 via an intelligent connection management unit 26.

Said codes make it possible for the protocol conversion unit 24:

for a transmission to a user terminal UT, to extract the payload data arriving in compliance with any of the service provider protocols, to reformat it selectively in compliance with any of the user protocols, and to transmit it to the addressee user terminal UT; and for a transmission to a service provider, to extract the payload data arriving in compliance with any of the user protocols, to reformat it selectively in compliance with any of the service provider protocols, and to transmit it to the addressee service provider.

Since the connections set up in this way between the users U and the service providers SP are generally secure (cf. feature i) below), the protocol conversion unit 24 constitutes a secure element of the platform. To this end, it is protected by hardware and software security means (e.g. by being physically closed and provided with firewalls).

In practice, any given user U can have a plurality of possible user terminals UT via which said user can communicate with a service provider SP. The problem of choosing the most appropriate user terminal then arises when a service provider wishes to make contact with a user, if it is to be avoided to contact said user on all of said user's terminals, which would tend to give rise to congestion of the communications media.

In order to solve this problem, the intelligent connection management unit 26 accesses a user terminal directory of the user database 22 that contains:

firstly the relationship links between each user U and each user terminal UT via which the user can be reached by the platform; and secondly, the relationship links between each user terminal UT listed in this way and the user protocol that it uses. For example, if the user terminal UT is a mobile telephone terminal 2, the second communications terminal can be the GSM, UTMS protocol via the operator on which it is parented. A relationship thus exists between each user terminal UT and the communications operators.

The directory thus makes it possible to determine the candidate user terminals UT for each user U, and to determine how to access them.

In order to establish intelligent selection of any particular one of the user terminals, the connection management unit 26 further has access to a "user terminal intelligent selection" second directory of the user database 22. This directory contains, for each user U, the following parameters:

a link between each of the user terminals listed in the first directory and the time variable (date and time of day of connection request), making it possible to facilitate selection of a candidate terminal as a function of said variable;

a link between said terminals and the geographical situation of the user, making it possible to facilitate selection of a candidate terminal as a function of the location of the user;

detection of the active terminals;

the history of the prior uses of the terminals (last used, etc.);

the specific wishes of the users (e.g. using a list of preferences);

the technical characteristics of possible user terminals (terminal models, available memory capacity, etc.);

the indications for selection as a function of the technical characteristics of the message to be forwarded from the service provider SP (volume in bytes, text, image, sound file, etc.);

the indications for selection as a function of the characteristics of the contents of the message (degree of urgency, confidentiality, generic or specific contents, etc.); and the service provider who might contact the user.

The time variable and geographical situation parameters can be combined in an overall criterion if the geographical situation can be determined only on the basis of the time variable.

The parameters are combined and weighted by the intelligent connection management unit 26 on pre-established bases so as to deliver as output the specific choice of the user terminal UT that is to be accessed for each connection request from a service provider.

The intermediation platform 12 of the preferred embodiment offers a range of technical features aiming to unite the service providers SP and the users U. These features are centralized around the intelligent connection management unit 26 which groups together the intelligence of the intermediation platform 12, and which, in this capacity, performs, inter alia, internal management and delegation of tasks to the other units.

In the example, the features are as follows:
i) security for making the link between the user and the service provider secure;
ii) management of services; and
iii) rationalized invoicing.

i) Security for making the link between the user and the service provider secure.

This feature comprises:
firstly checking the identities of the user and of the service provider for a given service; and
secondly setting up a secure communications tunnel between the user and the service provider SP.

The security for the link between the user and a service provider is managed by a security unit 28 with reference to security files stored in the service provider database 20 and in the user database 22, using techniques that are known per se.

More particularly, the security unit 28 accesses an "identification" first set of security files and an "enciphering" second set of files.

For each user U and for each service provider, the first set of security files comprises:
the personal identity data of the user/of the service provider, including the various personal codes, International Mobile Subscriber Identity (IMSI)/Individual Subscriber Authentication Key (Ki) identifiers, passwords, logins, symmetric keys and asymmetric keys, etc.
the links between the personal identity data and the services of the service providers for which the data will be requested; and
a personal identifier specific to the intermediation platform and making it possible to check the right of access thereto.

For each user U and for each service provider, the second set of security files comprises:
the various enciphering algorithms used for interchanging sensitive data between the user and each service provider SP;
the data specific to the enciphering: public keys and private keys, module keys, coefficients of mathematical functions, etc.;
the protocols for interchange of such specific data for establishing the enciphering; and
the links between this information and each service provider, making it possible to adapt the enciphering and thus the secure communications tunnel between the user and a service provider on specific terms.

By using said security files, the security unit 28 thus makes it possible to offer security guarantees both for the service provider and for the service user, the service provider no longer having to make the identity checks for itself, and being guaranteed that all transactions will take place automatically in a protected environment under the auspices of a trustworthy third party.

ii) Management of Services

The intermediation platform 12 makes it possible for the user to register with it either for a new service or for a new parameterization of a service for which the user is already registered. It also enables users who are subscribers to a communications gateway operator of the MNO type to access all of the services offered by the service providers. It then takes charge of the logistics aspect of activating the service and of making it available on the user terminal UT. In other words, the service provider SP merely needs to give approval, the platform being capable of downloading the software and the access codes relating to the new services or to their new parameterization.

This aspect is handled by a service management unit 30 that has access to a library of application programs and of parameterizations relating to the various services offered by the service providers, which library is contained in the service provider database 20.

From this library, the service activation unit 30 selectively extracts a program so as to download it to a user terminal UT of a user who has requested it. The authorization for the downloading is validated by an acceptance signal coming either directly from the service provider in question, or from data stored in the user database 22 that makes it possible to establish whether the requesting user is indeed authorized to receive the program in question.

Each program is stored in different forms in the library (language, internal parameterization, limited or full version, etc.) depending on the user terminal UT and therefore on the user to which it is destined. This information can be accessed remotely by the service provider for statistics purposes.

iii) Rationalized Invoicing

This feature is provided by an invoicing unit 32 that has access to a set of files in the service provider database 20 and in the user database 22. These files contain information relating to any transaction between each user U and each service provider SP that leads to an invoice (purchase of goods or of services) or entering into the calculation of invoicing (using up of flat-rate call time, etc.).

The intermediation platform 12 offers rationalized invoicing for all of the various services offered by the service providers SP. For the user, this feature makes it possible to pay in a single payment for a plurality of services provided by various service providers and obtained via the platform over a given period.

Overall invoicing is managed by an invoicing unit 32 that performs automated accounting for each user. This unit 32 includes a user database U, with, for each user, links concerning:
each pay service to which the user is subscribed, and the corresponding personalization (flat-rate call time, extent of services, etc.);
the pricing for the service (sum per unit of time used (telephony, information bases, etc.) or per unit of quantity of modules (files, films, pieces of music, etc.) downloaded);
the amount of the invoice for each order placed for services enabling online purchases to be made (books, travel, tickets, articles from mail order catalogues, multimedia products, games, etc.); and
the provider of each service invoiced.

In addition, the invoicing unit 32 periodically distributes the payments collected from the set of users U to the various providers SP on the basis of such automated accounting. It also sends to the service providers the itemized information contained in its database for internal management purposes.

The invoicing unit 32 also manages payment to the various operators of the non-Internet channels NIC, e.g. the mobile telephone operators (MNOs) in order to invoice the communications service proper.

It then becomes possible, via the intermediation platform 12:

to pay on line;

to invoice the service providers;

to invoice the users;

to record transactions; and to pay over sums to the non-Internet channel operators.

In a variant, the user communications terminal has an application whose function is to store, in a secure memory of the terminal, data that is characteristic of the services used by the user, and that is necessary for invoicing. For example, the application and the secure memory space can be situated in the security module of a mobile telephone. The intermediation platform periodically enters into communication with the terminal in order to transfer said data so as to perform invoicing using the above-described method. Such periodic communication can be established on the initiative of the platform, which chooses a slack period in which activity drops, or on the initiative of a terminal, e.g. when its secure memory becomes saturated. This mode of producing invoices offers the advantages of imparting flexibility to the intermediation platform which does not need to store, in real time, the information on all of the transactions, of making a high level of reliability and security possible because the terminals generally have secure means such as a security module, and are best placed to record all of the services implemented by a user via said terminals. For example, such a service can be a security service consisting in forming a digital signature, each digital signature formed by a user terminal being counted so as to be invoiced using the above-described method.

Examples of operation of the intermediation platform 12.

The platform offers a myriad of operating possibilities because of the multiplicity of its features and of its possibilities for cooperation between its features, and, via its communications means, with the service providers SP and the users U. The following examples of use constitute merely a small sample of these possibilities.

I. Use of the intermediation platform by a user.

This case of use involves the following steps:

I.i) The intelligent connection management unit 26 detects a connection request from a user for connection via a second protocol.

The connection management unit permanently receives all of the incoming calls arriving at the protocol conversion unit, and initiates the remainder of the connection process as soon as a call is received.

I.ii) The security unit 28 identifies the calling user.

The call from the user from its user terminal goes through software for general filtering and reception produced by the intermediation platform and serving as a general portal.

The software detects firstly whether the user is already registered and then makes it possible for the user to transmit to the intermediation platform the personal access code of the user.

If the transmitted code is valid, the platform then transmits to the user terminal a validation code enabling the general filtering software to present a page giving access to the available services.

I.iii) The service management unit 30 requests access to a service offered by a service provider.

The user thus validly identified selects a service from the access page, and the software specific to the selected service appears on the user terminal. The user terminal transmits to the platform the personal codes of access to the service, which codes are recognized by the service management unit 32. The service management unit activates the software in question at the platform so as to handle management of the running of the software. It informs the intelligent connection management unit 26 of the service provider SP in question.

I.iv) The intelligent connection management unit 26 identifies the channel for access to the service provider SP in question.

This identification is performed by referring to the service provider databases 20 which identify the channel implementing a first protocol for each user, possibly with selection criteria when a plurality of channels are possible. The choice can thus be guided by the state of congestion of the various channels.

I.v) The security unit 28 verifies the identity of the service provider SP.

The security unit verifies the identity of the called service provider analogously to the verification of the user U in step I.ii) above.

I.vi) The protocol conversion unit 24 sets up a communication with the service provider SP.

The protocol conversion unit calls the service provider in question by using the communications channel of the first protocol indicated by the intelligent connection management unit 26.

I.vii) The protocol conversion unit creates a communications link with conversion between the first and second protocols so as to interconnect the validly identified user and the validly identified service provider.

When the service provider is validly identified, the protocol conversion unit 24 acts to enable data to be interchanged in both directions between the service user and the service provider, by reformatting the data from the first protocol used to the second protocol used, and vice versa.

If it is required for the communications link between the service provider SP and the user U to be made secure, the platform performs an additional step, during creation of the link (cf. step I.vii) above), which additional step consists in making the link a secure communications tunnel (SCT), by using the security unit 28. The tunnel is based on enciphering between the service provider SP and the user U.

To this end, the smart card of the user terminal UT selectively transmits the enciphering keys, personal codes, identifiers, IMSI/Ki key of the GSM subscription, key specific to the platform, etc. to the security unit of the platform, the service provider SP doing the same.

Advantageously, the code is stored, like all the other security data, in a chip card associated with the terminal (e.g. a Subscriber Identity Module (SIM) card for a mobile telephone).

It should be noted that the platform thus performs the tasks essential to security from one end to the other of the communications link between the user U and the service provider SP, in transparent mode and without any direct action from said service provider.

I.viii) The invoicing unit 32 invoices the user.

At regular intervals, e.g. once per month, the invoicing unit 32 transmits to the user an overall and itemized invoice produced for all of the services provided by the various service providers SP during the interval.

II. Use of the intermediation platform by a service provider.

The intermediation platform 12 serves as single entity for the service providers, for communicating directly with the users, and for delegating tasks that ordinarily they must perform. A service provider SP can thus initiate a communication with a particular user or with a group of users, selected on the basis of technical criteria (e.g. users having terminals of a certain type) or commercial criteria (e.g. using a certain type of service).

In both cases, the process of use is substantially analogous to when a user U initiates the connection, the steps being as follows:

II.i) The intelligent connection management unit 26 detects a connection request from a service provider for connection via a second protocol. This step is analogous to step I.i) above, with the second protocol being detected.

II.ii) The security unit 28 checks the identity of the service provider SP.

This step is identical to step I.vi above.

II.iii) The intelligent connection management unit 26 searches for the at least one user to be reached.

The connection management unit 26 interrogates the service provider to determine the user U or the group of users that the service provider wishes to reach via the intermediation platform 12, either by a nominative indication or by predetermined selection criteria.

II.iv) The intelligent connection management unit identifies a non-Internet channel (NIC) to be used to reach the or each user U specified by the service provider SP.

After having determined each user to be reached, the intelligent connection management unit 26 searches the user databases 22 for:

identifying intelligently the user terminal UT with which a link is to be set up, by referring to the selection criteria in the user database 22; they make it possible, in particular, to select one of a plurality of possible terminals in the possession of the user; and identifying the communications channel implementing the second protocol to be used for the user terminal of the user, or of each user of the group, indicated by the service provider.

II.v) The security unit 28 checks the identity of each specified user.

This step is identical to step II.ii) above, as applied to the or each specified user.

II.vi) The protocol conversion unit 24 sets up a communication with each user U identified.

This step is analogous to step I.vi) above, the connection being set up this time over a non-Internet channel NIC using a second protocol making it possible to reach the user or each user whom the service provider wishes to contact.

II.vii) The protocol conversion unit creates a communications link with protocol conversion between the first and second protocols so as to connect the service provider with each specified and validly identified user This step is identical to step I.vii) above, possibly as applied to a plurality of users.

The security option for creating a secure communications tunnel that is described above for step I.vii) can also apply in this case, performed in the same way.

Thus, the service provider SP accesses a given user U or a given group of users U by firstly calling the intermediation platform 12 so as to dialogue with the intelligent connection management unit 26.

II.viii) The invoicing unit 32 pays the service providers for the services.

At regular intervals, e.g. once per month, the invoicing unit 32 pays over to the service providers the sums that are due to them and that have been invoiced in step I.viii) above.

It should be noted that the invention offers major advantages because it enables three entities to be used optimally, namely the user terminals, the communications gateways, and the service providers, by means of the use of a fourth entity, namely the intermediation platform of the invention. Each entity obtains a situation that is more advantageous:

A user can go transparently from one service to another, free of the constraints related to a particular communications operator. At any given place, a user can use two different communications operators to obtain two different services. The user can thus access the services in geographically transparent manner, since they can cross borders without that having any influence on the service used. The invention thus represents an advantageous solution for tracking subscribers, such a solution being known as "roaming". As explained above, a subscriber to any given operator can, in flexible and user-friendly manner, use the communications networks of other operators with whom they have no subscription.

A communications operator can offer its communications service to users other than its subscribers, and can make it possible for its subscribers to access a large number of services in user-friendly manner.

A service provider can access a large number of users without having to go through a particular communications operator.

In addition to the above advantages, it should be noted that the invention offers the following remarkable capacities:

capacity to be adapted or upgraded, user-friendliness (choice of connections), and flexibility (by combining various functions);

security through: i) identifying the players (users and service providers) and ii) creating end-to-end security, with a secure communications tunnel being set up, thereby creating end-to-end security between the user and the service provider;

management of the services; and rationalized invoicing.

The invention makes it possible for numerous variants to be obtained in terms of the features offered, of the communications means used by the platform, of the management of transactions, and of the software and hardware means implemented, etc.

The invention claimed is:

1. Intermediation apparatus to interconnect at least one service provider and at least one user provided with at least one communications terminal, said intermediation apparatus comprising:

intelligent connection management means for:

selecting a non-Internet channel of an operator, which channel is used by a terminal of the user; and selecting an outgoing protocol and an outgoing communications channel by referring to databases;

protocol conversion means controlled by the management means so as to interconnect a service provider using a channel that implements a first communications protocol and a user using the non-Internet channel that implements a second communications protocol; and an invoicing unit which performs overall and automated invoicing for each user and periodic distribution of payments collected from the user to the various service providers and to the various operators of the non-Internet channels.

2. Apparatus according to claim 1, wherein the non-Internet channel comprises at least one mobile telephone network of a given operator.

3. Apparatus according to claim 1 wherein the connection management means select a non-Internet channel from among a plurality of possible channels for reaching a terminal of a user on the basis of optimized selection criteria stored in said databases, said stored criteria comprising at least one of the following:
- time at which the connection request is made;
- geographical situation of the user;
- detection of active user terminal(s);
- history of prior uses of the user terminals;
- specific desires made known by the user;
- technical characteristics of possible user terminals;
- technical characteristics of the message to be forwarded from the service provider;
- contents of a message; and
- service provider.

4. Apparatus according to claim 1, further comprising means for identifying a service provider and a user.

5. Apparatus according to claim 1, further comprising security means for setting up a secure communications link between the service provider and a user terminal of a user.

6. Apparatus according to claim 1, further comprising service management means comprising means for storing service software and means for selectively downloading software to a given user terminal.

7. Apparatus according to claim 1, wherein the invoicing unit accesses files from a service provider database and from a user database, wherein said databases contain information relating to any transaction between each user and each service provider so as to send to each user an overall invoice for all of the sums due for each service obtained with one or more service providers over a given interval of time.

8. Apparatus according to claim 1, wherein a user terminal contains an application and a secure memory in order to store characteristic data of the services used, and the apparatus periodically enters into communication with the user terminal in order to transfer the characteristic data of the services used by the user by means of the terminal which data is necessary for invoicing.

9. Apparatus according to claim 8, wherein the transfer of the characteristic data that is necessary for invoicing is automatically performed during slack periods during which activity drops.

10. Apparatus according to claim 8 wherein the characteristic data necessary for invoicing is transferred to secure memory of a telephone.

11. The use of apparatus according to claim 1 for enabling a service to be distributed by a service provider.

12. The use of apparatus according to claim 1 by an operator of non-Internet communications channels to make it possible to distribute services via its communications network.

13. The use according to claim 12, wherein the terminal is operated on the basis of a mobile telephone operator.

14. A method for enabling a user to access a service provided by a service provider by means of intermediation apparatus, said method comprising the following steps:
- detecting a connection request from a user for connection using a second protocol over a non-Internet communications channel;
- checking the identity of the user;
- requesting a service offered by a service provider;
- identifying a channel implementing a first protocol and to be used to reach the service provider requested by the user;
- checking the identity of the service provider;
- setting up a communication with the service provider;
- creating a communications link with conversion between first and second protocols so as to interconnect the validly identified user and the validly identified service provider;
- recording the service data that is necessary for invoicing;
- performing overall and automated invoicing for each user; and
- periodically distributing collected payments to the various service providers and to the various operators of the non-Internet channels.

15. A method for distributing services to at least one user from a service provider by means of intermediation apparatus, said method comprising the following steps:
- detecting a connection request from a service provider for connection using a first protocol;
- checking the identity of the service provider;
- searching for at least one user to be reached;
- identifying a non-Internet channel to be used to reach each user specified by the service provider;
- checking the identity of each user specified;
- setting up a communication with each user specified;
- creating a communications link with conversion between first and second protocols for connecting the service provider with each specified and validly identified user;
- recording service data necessary for invoicing;
- performing overall and automated invoicing for each user; and
- periodically distributing collected payments to the various service providers and to the various operators of the non-Internet channels.

16. Apparatus according to claim 1, further including means for tracking subscribers, to enable non-Internet channel operators to be changed as a function of the use of a given service, in a manner transparent for the user.

* * * * *